United States Patent [19]
Guntert et al.

[11] Patent Number: 5,590,977
[45] Date of Patent: Jan. 7, 1997

[54] FOUR TRACK PAVING MACHINE AND PROCESS OF TRANSPORT

[75] Inventors: Ronald M. Guntert, Stockton; Steve Mickelson, Chico, both of Calif.; J. Kenyon Schaeffer, Englewood, Colo.

[73] Assignee: Guntert & Zimmerman Constr. Div. Inc., Ripon, Calif.

[21] Appl. No.: 450,242

[22] Filed: May 25, 1995

[51] Int. Cl.[6] .................................................. E01C 19/12
[52] U.S. Cl. ........................................ 404/101; 404/105
[58] Field of Search .............................. 404/85, 88, 100, 404/101, 102, 104, 105, 106, 108, 110, 119; 280/638

[56] References Cited

U.S. PATENT DOCUMENTS

| 3,970,405 | 7/1976 | Swisher, Jr. et al. | 404/105 |
| 5,282,644 | 2/1994 | Larson | 280/638 |

FOREIGN PATENT DOCUMENTS

| 2673592 | 9/1992 | France | 280/638 |

*Primary Examiner*—Dennis L. Taylor
*Assistant Examiner*—Pamela A. O'Connor
*Attorney, Agent, or Firm*—Townsend and Townsend and Crew LLP

[57] ABSTRACT

A four track paver is disclosed having a frame which telescopes for transport to reduce the dimension of the machine in the direction of paving machine travel. A rectilinear tractor frame is provided. The frame includes four crawler tracks, one at each corner of the frame. The crawler tracks are directly supported on a hydraulic cylinder and mounted for pivotal movement about the axis of the hydraulic cylinder. The frame telescopes at side bolsters between the leading and trailing crawler tracks at the sides of the machine. When expanded, the paving machine has the full dimension required for paving. When contracted, the paving machine has a profile allowing convenient transport. Most importantly, such expansion and contraction of the machine in the direction of paving travel does not require substantial time for disassembly. As a consequence, a convenient method of loading and off loading to a hauling flatbed trailer exists. With the frame contracted at the side bolsters and the tracks pivoted parallel to the pavement spanning dimension of the frame, both frame and paving kit are elevated and a transporting flatbed trailer moved under the paver. Supports are installed to relieve the paving kit from the full weight of the frame, and the tracks lifted. There results a four track paver profile transportable within the maximum load width envelope which can be legally transported on a highway without a pilot car (in the U.S.A. this is 12' or 3.657 M) with minimal machine disassembly for transport.

16 Claims, 8 Drawing Sheets

FOUR TRACK PAVING MACHINE AND PROCESS OF TRANSPORT

This invention relates to concrete pavers of the slipform variety. More particularly, a four track concrete paver is disclosed which has side bolsters which telescope for transport in the direction of paving machine travel. This bolster telescoping enables collapse of the machine side bolsters working in conjunction with turning the crawler tracks. Transport width can be limited to a maximum load width envelope which can be legally transported on the highway without a pilot car (in the U.S.A. this is 12' or 3.657 M). This invention also substantially reduces machine disassembly and the time required to prepare the machine for transport.

BACKGROUND OF THE INVENTION

Concrete slipform pavers are known. Specifically, such pavers include a "tractor" and a "paving kit".

Regarding the tractor, most concrete slipform pavers include a tractor which is comprised of a rectilinear frame which straddles the concrete roadway or runway while they are paved. This frame is propelled and supported on either end by side bolsters and crawler track(s). The frame supports a diesel engine driven hydraulic power unit which supplies power to the tractor and paving kit.

The paving kit is typically suspended below the tractor frame by mechanical connections. The paving kit takes its hydraulic power from the power unit on the tractor. The tractor and paving kit comprising the slipform pass over the concrete placed in its path in a relatively even and level mass that can be conveniently paved. During this slipform process the tractor attached paving kit spreads the concrete dumped in the path of the paver, levels and vibrates it into a semi-liquid state, then confines and finishes the concrete into a slab with an upwardly exposed and finished surface. Sideforms mounted to the side of the slipform paving kit confine the sides of the slab during the paving process leaving a vertical edge on both sides of the slab once the slipform paving kit has passed.

The tractor typically has either two or four crawler tracks supporting and propelling the frame and attached paving kit. Other kits can be attached to these tractors such as kits for conveying and spreading concrete and trimming and spreading base materials. For the purposes of this description, we will focus on the paving kit used for slipform paving. These "two track" or "four track" pavers must be separately considered to fully understand this invention.

With respect to both two and four track pavers, it is known to telescope the tractor frame normal to the direction of the paving movement. This telescoping normal to the direction of the paving movement enables the frames to span different widths of pavements within the limits of the telescopic extensions. Once these telescopic extensions limits are reached, a fixed frame extension can be added to one or both sides of the telescopic tractor frame for further extension. Despite the telescopic ability of the frame, the process is still a relatively complex and time consuming operation. Adding a fixed frame extension(s) significantly increases the complexity and difficulty of the frame width change. What is more time consuming is changing the paving kit to span different widths of pavements. The paving kit comes in discrete sections. Each of these kit sections must be individually inserted or removed and the bolting connections between each section made or broken. It is not uncommon for more than one day to be consumed in such kit adjustments.

A two track paver tractor has one crawler track located on each side of the machine. Each crawler track at its point of attachment to the frame includes a hydraulic cylinder, one at each corner. Thus there are two cylinders per side. Typically, the front and rear cylinders on a side are connected to each other by means of a side bolster, which in turn is connected to the side of the tractor frame. On four track paver, each crawler track at its point of attachment to the side of the tractor frame includes a pivot arm with attached hydraulic cylinder. The pivot arm pivots about a vertical axis and allows the crawler track to pivot with respect to the corner of the tractor frame. The front and rear cylinders on a side are connected to each other by means of a side bolster which in turn is connected to the side of the tractor frame. The pivot arms are actually attached to each end of the side bolster. The pivoting movement is normally used to reposition the crawler tracks in relation to the machine. When transport is about to occur, pivoting occurs between a first disposition where the frame straddles pavement being placed to a second disposition where the crawler is disposed for transport parallel to the length of the frame for transport. These frame supporting hydraulic cylinders can raise or lower the tractor and paving kit relative to the crawler tracks.

The operation of a paver can be simply stated. Typically, a system of grade level reference wires are strung adjacent and parallel to the roadway or runway grade being constructed. Sensors with wire feelers, one located at each corner of the machine attached to the frame, follow the present grade wires. The leveling sensor on the frame independently adjusts the height of the frame relative to each of the crawler tracks at each corner of the frame. This adjustment occurs through the frame supporting cylinders at each of the crawler tracks at each of the four corners of the machine. The paving kit suspended from the frame thus is continually adjusted to maintain a preset elevation disposition relative to the wires as paving occurs.

Two track pavers have the advantage of being more suitable for small jobs because they are simpler with fewer moving parts and more convenient to transport. They are easier to transport because the crawler track length can be limited to an overall length matching the maximum load width dimension which can be legally transported on the highway without a pilot car (in the U.S.A. this is 12' or 3.657 M).

Disadvantages exist with such two track machines. Access to the sideforms attached to the paving kit is obstructed for cleaning the sideforms of accumulated concrete and for inserting side tiebars and dowel bars. Further, since we are limited as to how long the crawler tracks can be in order to conveniently transport the machine, the entire weight of the machine is borne by the two crawler tracks of a limited width. Consequently, high ground pressure is unavoidable, which allows the tracks to sink into soft subgrade or trackline (the grade immediately adjacent to either side of the slab where the crawler tracks travel) which can adversely affect the ability of the machine to hold a preset slab thickness or level. Another disadvantage of the two track machine, because the crawler is relatively short, is that the rear hydraulic cylinder for leveling is so close to the rear of the slipform pan where the final grade of the concrete slab is established. Ideally, as is the case with a four track machine, the front and rear hydraulic leveling cylinder should be roughly equidistant from the rear of the slipform pan to help average the correction for grade deviations. This feature has been understood to allow smoother slabs to be placed as compared to a two track tractor on most tracklines. Finally, loading of such machines onto a transporting flat bed truck requires placement of ramps with the two tracks climbing their own ramps onto the transporting trailer.

Four track pavers have the advantage of the front and rear hydraulic leveling cylinder being roughly equidistant from the rear of the slipform pan which helps average the correction for grade deviations as described above. Additionally, four track pavers allow the supporting crawler tracks to straddle the paving kit at the sides of the paver. One crawler track is spaced forward at the side of the machine, one crawler track is spaced rearward at the side of the machine, and the paving kit is exposed at the paving kit sideforms between the crawler tracks. Thus the sideforms are easily accessible and easier to clean. Moreover, joint forming and bar inserting apparatus is more easily suspended and accessible. For example, the insertion of reinforcing bars into the side of a paved slab is not as easily accomplished in the case of a two track paver because the tracks interfere with the required placement.

The greatest disadvantage of a four track paver occurs when the machine is configured for transport from one job site to another job site. Two problems are commonly encountered. The first problem is a series of required changes in the machine configuration for transport. The second problem is the length of the transported load.

A common expedient regarding machine configuration for transport is to pivot the four supporting crawler tracks from the frame straddling support position to where the crawlers are disposed for transport parallel to the length of the frame and within the width of the frame for transport in the travel position. First, the four crawler pivot arms are disconnected from where they are attached and secured into position to the front and rear of the tractor frame. Thereafter, the frame is supported and the crawler tracks are retracted off the ground so the pivot arm and crawler may be pivoted 90° so both the tracks and pivot arms within the width of the pavement spanning frame. Once this is done the pivot arms must be resecured in the transport position to hold the pivot arms in place. Hydraulic plumbing must also be modified to allow the machine to walk onto a transport trailer under its own power. Unfortunately, conventional four track paving machines when configured for transport require substantial alteration of both the frame and the paving kit before transport can occur.

Secondly, such machines when configured for the transport disposition have excessive length. In preparation for transport, the crawler tracks are swung on their pivot arms relative to the frame. Such swinging occurs from the position where the crawler tracks span the paving dimension of the frame to a position where the crawler tracks are in line with the dimension of the frame normal to the direction of the paver travel. When the crawler tracks are in line normal to the paving dimension of the machine, the crawler tracks add to the transport length of the machine. An example utilizing dimensions can be helpful.

Take the case of a four track paver configured for paving two lanes. Each lane is 12' for a total paving width of 24'. Each crawler track, when swung from a position which enables the frame to straddle the paving to a configuration crawler track is aligned parallel to the frame adds 12' to the length of the frame. It will thus be understood that the combination of the leading tracks and the trailing tracks adds 24' to the length of the frame. Consequently, when the four track paving machine is configured for transport, the total machine length exceeds 48 feet. When the paving width is 30 feet, a 54 foot transportable load is required.

Most transporting flat bed or single drop deck trailers are in the 40 foot range. Transporting a load over 48 feet is of considerable inconvenience. Further, the preparation of such transport is tedious—time intervals up to and exceeding one day are frequently required to prepare such a machine for transport.

SUMMARY OF THE INVENTION

A four track paver is disclosed having a frame which telescopes for transport to reduce the dimension of the machine in the direction of paving machine travel. A rectilinear tractor frame is provided. The frame includes four crawler tracks, one connected to each corner of the frame via a side bolster. The crawler tracks are directly supported on a hydraulic cylinder and mounted for pivotal movement about the vertical axis of the hydraulic cylinder. The frame telescopes at side bolsters between the leading and trailing crawler tracks at the sides of the machine. When expanded, the paving machine has the full dimension required for paving. When contracted, the paving machine has a profile allowing convenient transport. Most importantly, such expansion and contraction of the machine in the direction of paving travel does not require substantial paver or paver kit disassembly. As a consequence, a convenient method of loading and off loading to a hauling flatbed trailer exists. With the frame contracted at the side bolsters and the tracks pivoted parallel to the pavement spanning dimension of the frame, both frame and paving kit are elevated and a transporting flatbed trailer moved under the paver. Supports are installed to relieve the slipform paving kit from the full weight of the tractor frame, and the tracks lifted. There results a four track paver profile transportable within a maximum width envelope which can be legally transported on the highway without a pilot car (in the U.S.A. this is this is 12' or 3.657 M.

DESCRIPTION OF THE PREFERRED EMBODIMENT

Figure 1A:
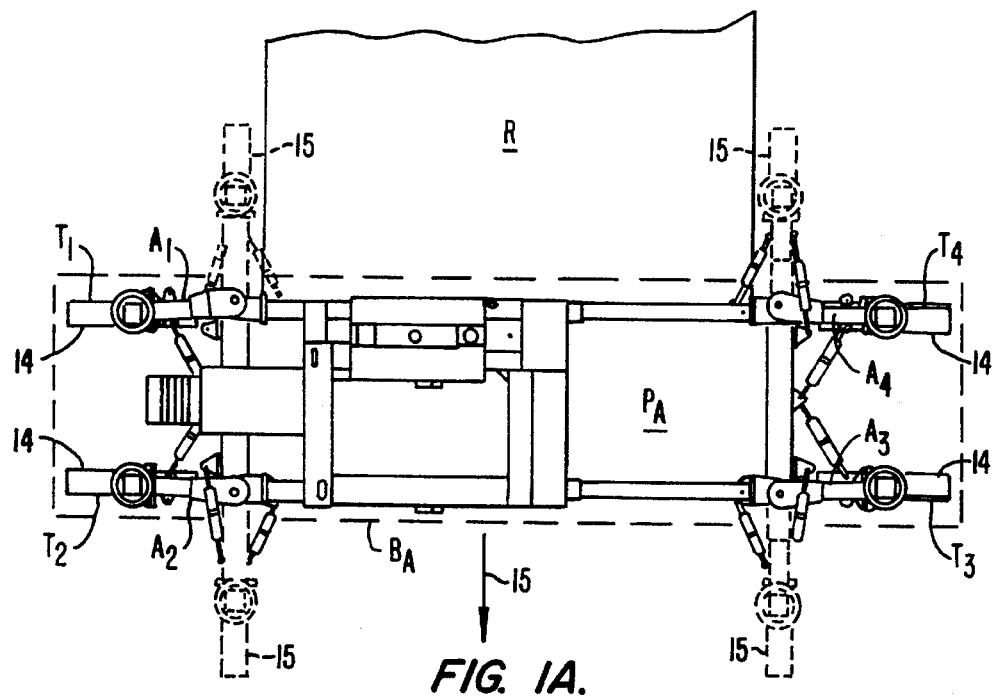
FIG. 1A is a plan view of a prior art four track paver illustrating the pivot of the tracks for transport adding to the transportable length of the paver load.

Referring to FIG. 1A, a prior art four track paver $P_A$ is illustrated. Tracks $T_1$–$T_4$ are each mounted on pivot arms $A_1$–$A_4$. As can be seen, these respective pivot arms $A_1$–$A_4$ are disposed in paving transport disposition 14 to prior art transport paver frame $F_A$ in direction 15 for paving of roadway R.

For transport of prior art four track paver $P_A$, pivot arms $A_1$–$A_4$, each pivotal about a vertical axis, swing the respective tracks $T_1$–$T_4$ approximately 90°. This causes tracks $T_1$ and $T_2$ on one side of four track paver $P_A$ and tracks $T_3$ and $T_4$ on the other side of four track paver $P_A$ to add to the respective length that must be hauled when the paver is moved. As set forth in the preceding example, loads in excess of 48 feet in length can be encountered. It will be seen that the outline of flatbed trailer B is shown in the plan view of FIG. 1 in broken lines. Typically, loading occurs by providing a ramp and causing tracks $T_1$–$T_4$ to crawl onto flatbed trailer B.

Figure 1B:
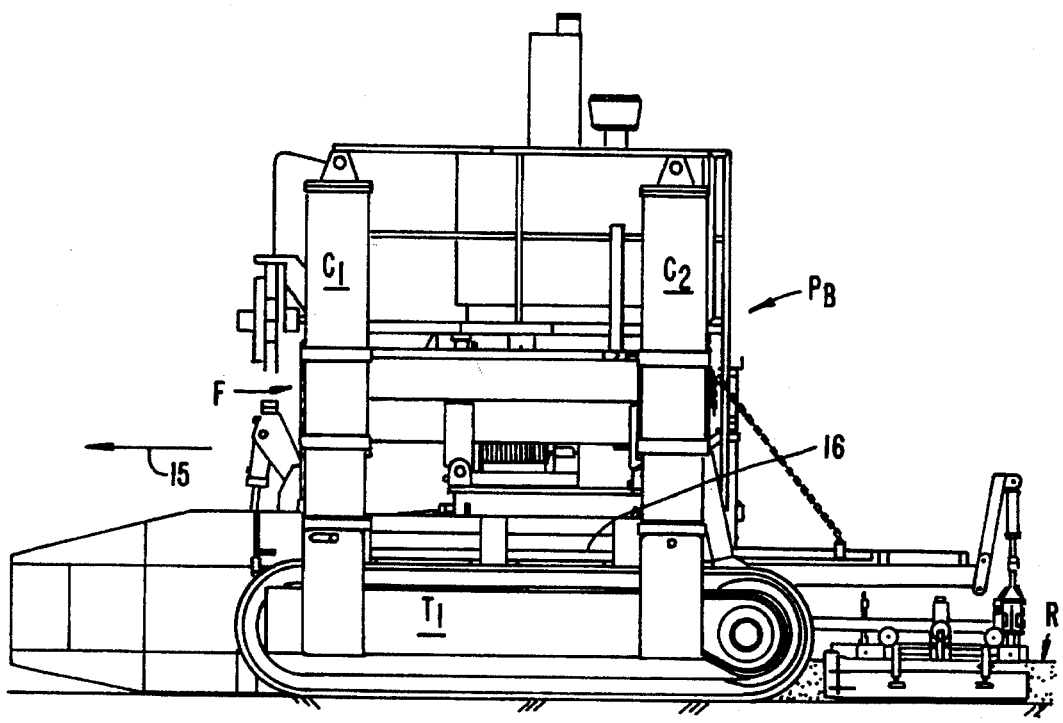
FIG. 1B is a side elevation of a two-track paver taken in the plane of machine travel.

Referring to FIG. 1B, the typical two track paver is shown in side elevation only. Track $T_1$ only is shown supporting one entire side of two track paver $P_B$. As before, four hydraulic cylinders $C_1$–$C_4$ with only cylinders $C_1$–$C_2$ being visible in the illustration. The remaining paver components are conventional, similar to those already set forth, and will not be repeated here. As you can see the sideforms 16 are difficult to access because of the track ($T_1$) location.

Having set forth the prior art, attention can now be directed to the paver of the present disclosure.

Figure 2:
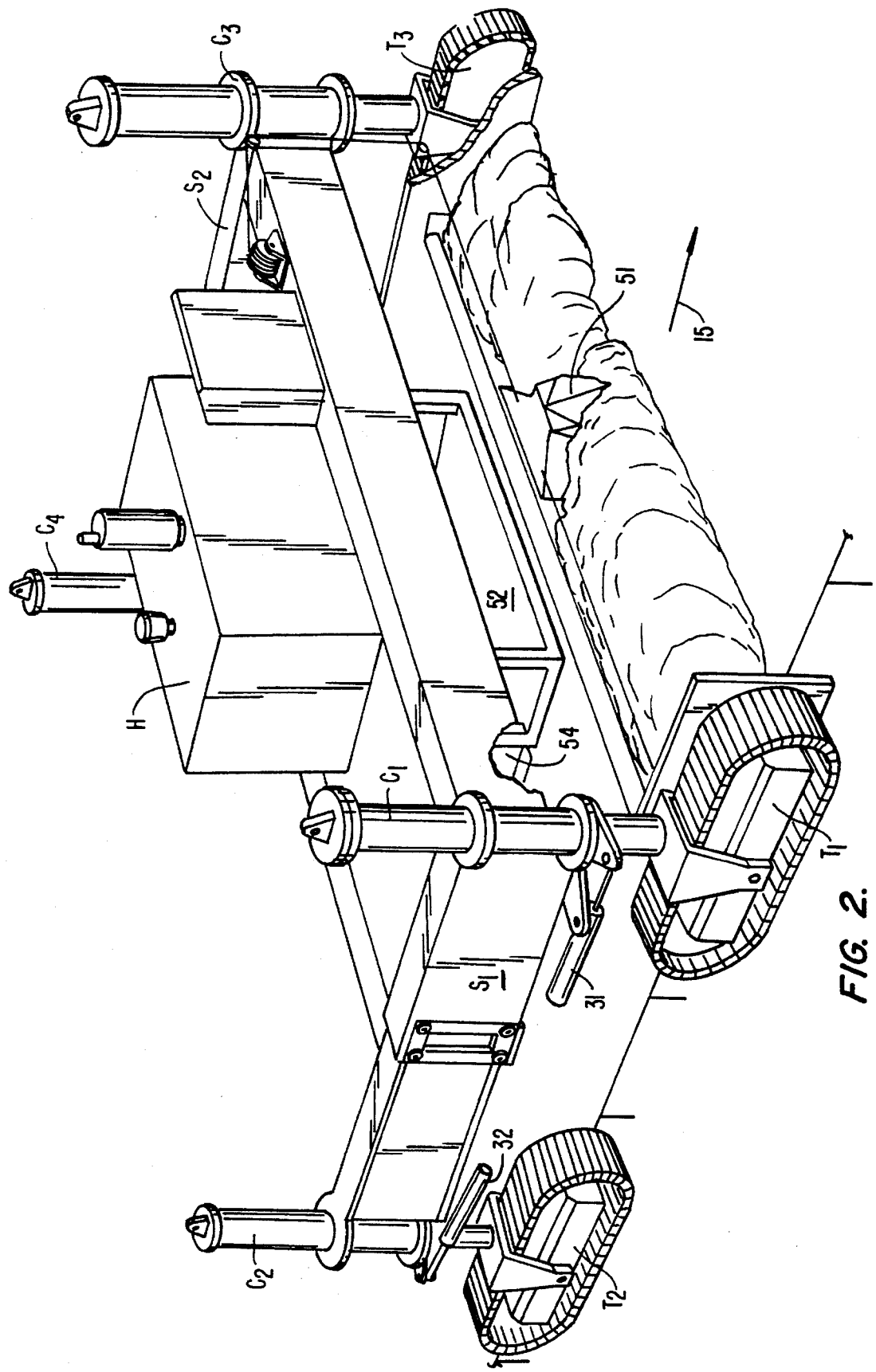
FIG. 2 is a perspective view of the paver of this invention configured for paving operation.
Figure 3:
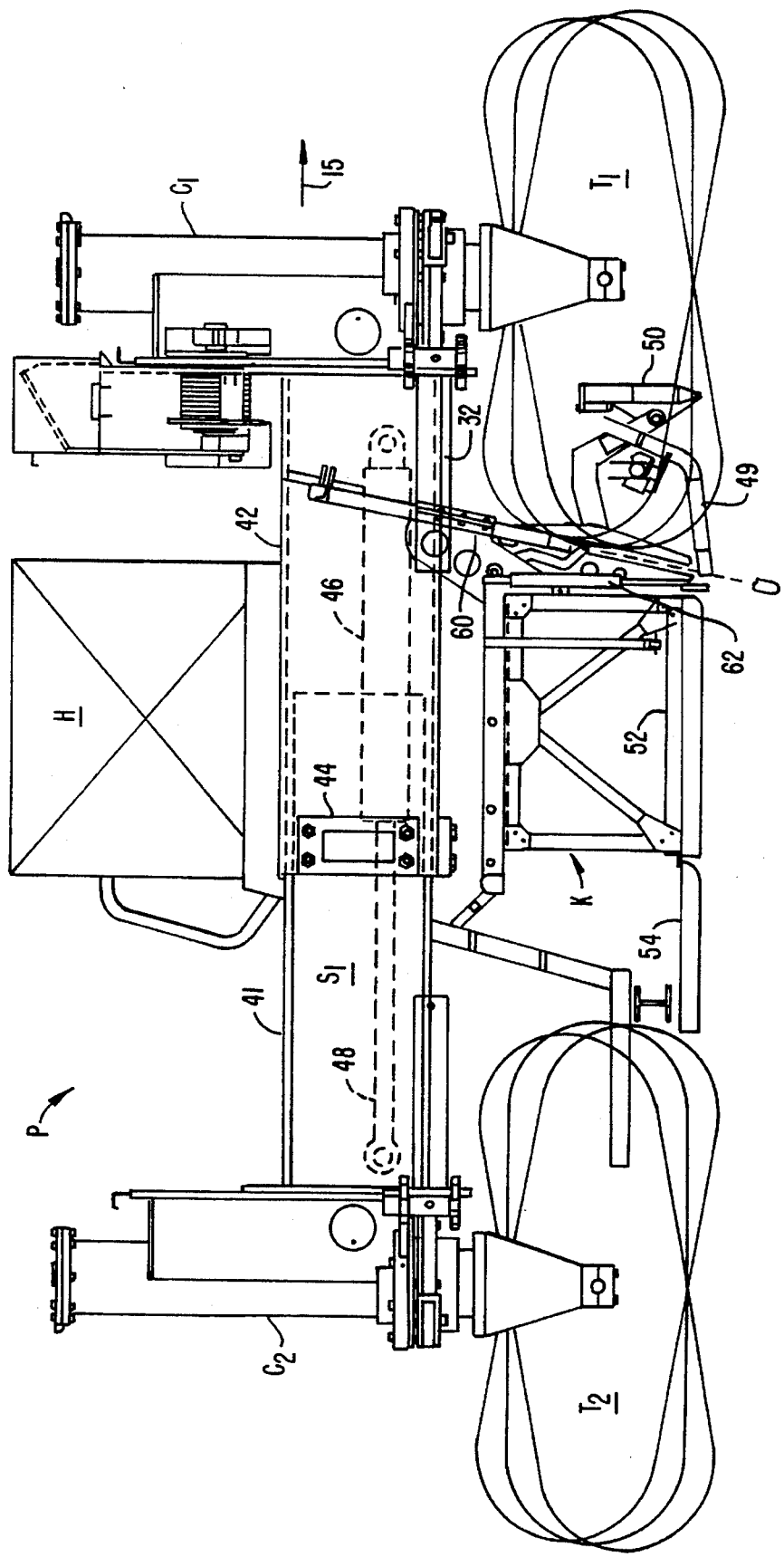
FIG. 3 is a side elevation of the paver illustrating the side bolsters extended for paving kit operation.
Figure 4:
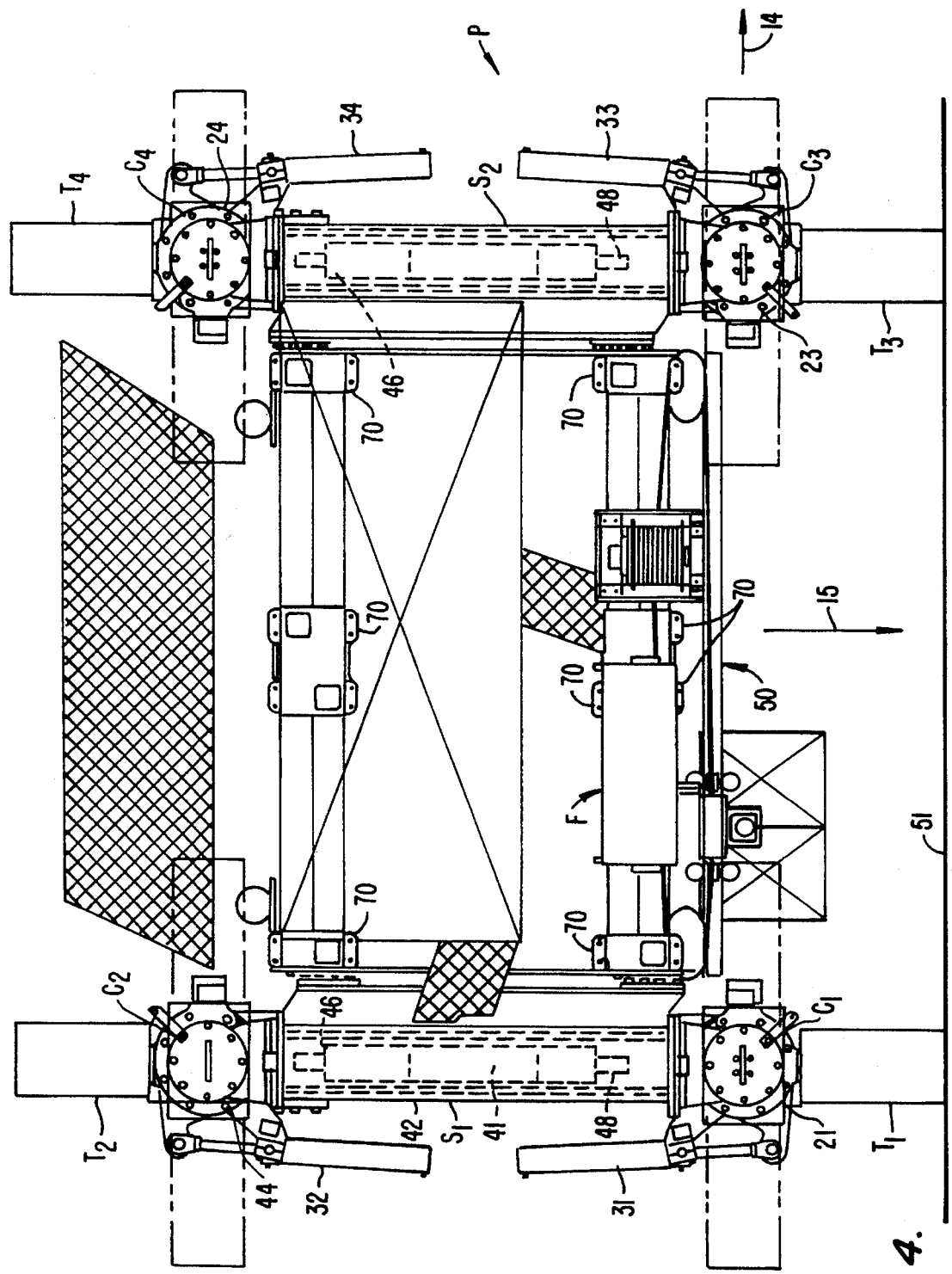
FIG. 4 is a plan view of the paver most importantly illustrating the turning of the frame propelling tracks.

Referring to FIGS. 2, 3, and 4, four track paver P is illustrated. Frame F includes hydraulic cylinders $C_1$–$C_4$ respectively having corners 21–24 of paver frame F attached to the outer portions of the cylinders and respective tracks $T_1$–$T_4$ attached to the lower portions of the cylinders. As can be seen, these respective tracks $T_1$–$T_4$ can all be turned by respective turning cylinders 31–34. As will hereafter be developed, these respective turning cylinders 31–34 pivot tracks $T_1$–$T_4$ 90° to enable convenient transition from the transport mode to the paving mode. It will be noted that the present construction may vary the location of the lever arm and steering cylinders common to prior art machines.

Paver frame F differs from prior art frames in the configuration of side bolsters $S_1$–$S_2$. Each side bolster S includes female telescoping member 42, male telescoping member 41 and clamp 44 mounted to the end of female telescoping member 42. Internally, each side bolster S includes hydraulic cylinder 46 with protruding male cylinder member 48. It will be understood that with this arrangement, contraction and expansion of paver frame F at side bolsters $S_1$–$S_2$ can readily occur. Specifically, with clamp 44 loosened, hydraulic cylinder 46 can expand or contract at male cylinder member 48 to cause the respective male telescoping member 41 and female telescoping member 42 to likewise expand or contract. Thus the dimension of paver frame F in direction 15 can expand and contract. As will hereafter become apparent, paver frame F in the expanded disposition is usually disposed for paving; paver frame F in the contracted position is usually disposed for transport. It will be noted that the present construction shown may vary the location of the required clamps; moreover, rollers and/or low friction plastic may be incorporated in the telescopic bolster design to reduce the friction present between the male and female telescopic tubes.

The remainder of the attachments to paver frame F are largely conventional. The leading edge of paving kit includes metering gate 50 help maintain a constant level over vibrators 49. Spreader plow 51 functions to spread concrete dumped in the path of the paver for uniform distribution to roadway R being paved. It is recognized that in lieu of a spreader plow an auger may be used to spread and convey the concrete. Slipform pan frame 52 forms and confines the vibrated concrete. Float pan 54 finishes the surface in the wake of the paver. A conventional reinforcing bar inserter 60 inserts bars at the location of the longitudinal joint to join adjacent slabs. A tamper bar 62 helps finish the concrete slab. A tamper bar is an optional attachment that is sometimes not elected. All these respective accessories and tracks are powered by hydraulic unit H. It is to be understood that other commonly used paving machine accessories can all easily be accommodated by frame F including separate base trimming and spreading or concrete conveying and spreading kits.

Returning to FIG. 4, it is to be understood that paver frame F like all conventional paver frames can expand in dimension across roadway R being paved. Specifically, provision is made for telescopic frame clamping at clamp point 70. As has been previously set forth, such expansion is not a trivial exercise.

We have observed that while side-to-side expansion and contraction of the paver is complex and to be avoided wherever possible, the expansion and contraction of paver frame F in direction 15 of machine travel produces far less complication. Specifically, expansion and contraction of side bolsters $S_1$–$S_2$ requires very little effort. It is this observation that makes possible the loading sequence illustrated in FIGS. 4, 5, and 6.

Referring to FIG. 4, as a first step in the preparation for transport, tracks $T_1$–$T_4$ are each pivoted 90° from the paving disposition shown in solid lines to the transport disposition shown in broken lines. This disposes tracks $T_1$–$T_4$ across the paving direction 15 in readiness for transport. Paver frame F at side bolsters $S_1$–$S_2$ is left in the expanded disposition (contrary to the compressed view required by space considerations in FIG. 4).

Figure 5:
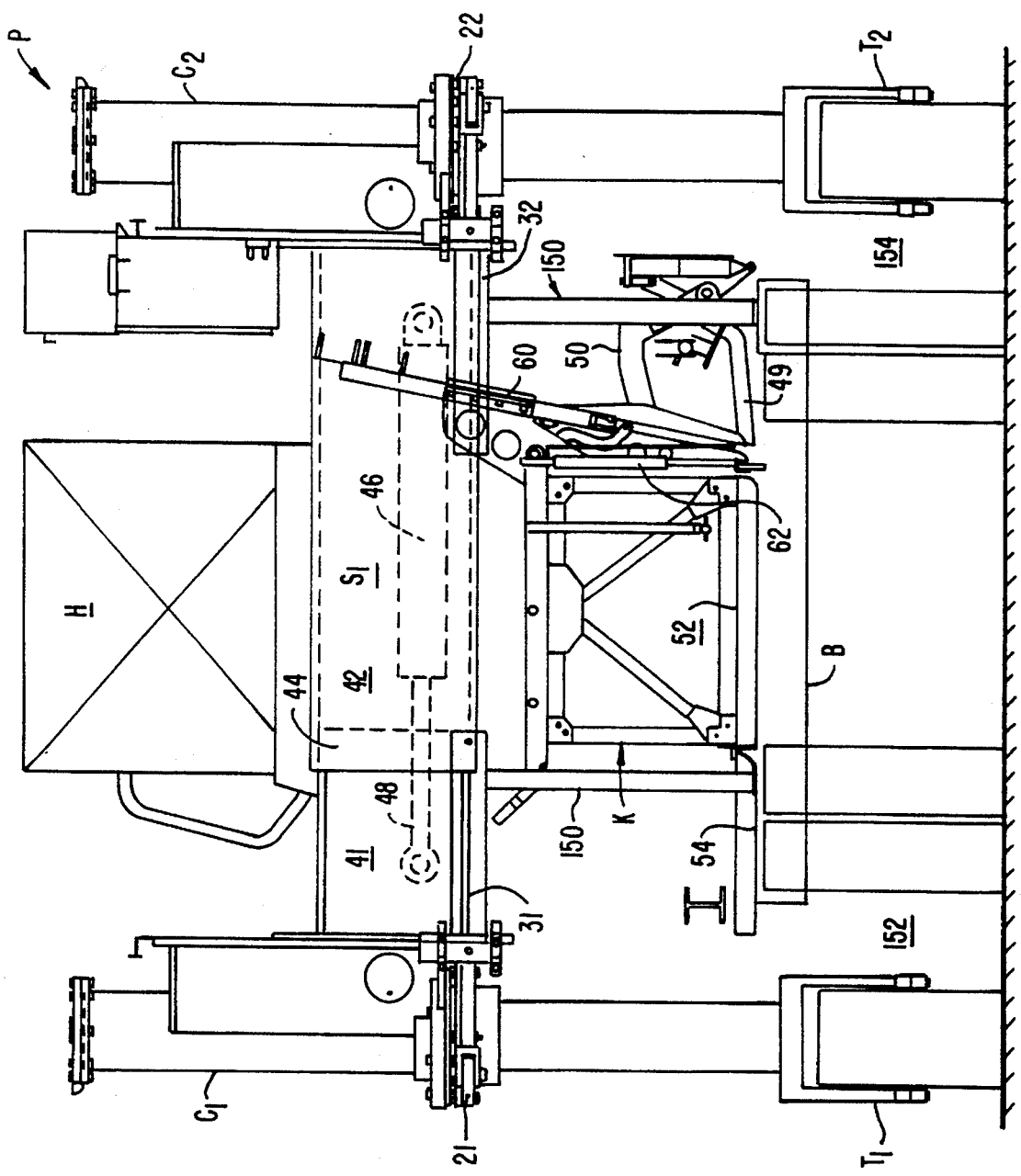
FIG. 5 is a side elevation of the paver taken with the aspect of FIG. 3 illustrating the frame propelling tracks turned for transport, the frame still expanded at the side bolsters, and a flat bed truck back under the paver preparatory for transport.

Referring to FIG. 5, hydraulic cylinders $C_1$–$C_4$ are fully elevated. Flatbed trailer B is backed under the paver. Thereafter, hydraulic cylinders $C_1$–$C_4$ are slowly lowered until paver kit K is partially supported on flatbed trailer B.

It will be understood that it is not desirable that the paver kit K support the full weight of four track slipform paving paver P. This being the case, support stanchions 150 between flatbed trailer B and paver frame F are provided where needed. Such stanchions 150 are placed until paver frame F is fully supportable from flatbed trailer B.

Figure 6:
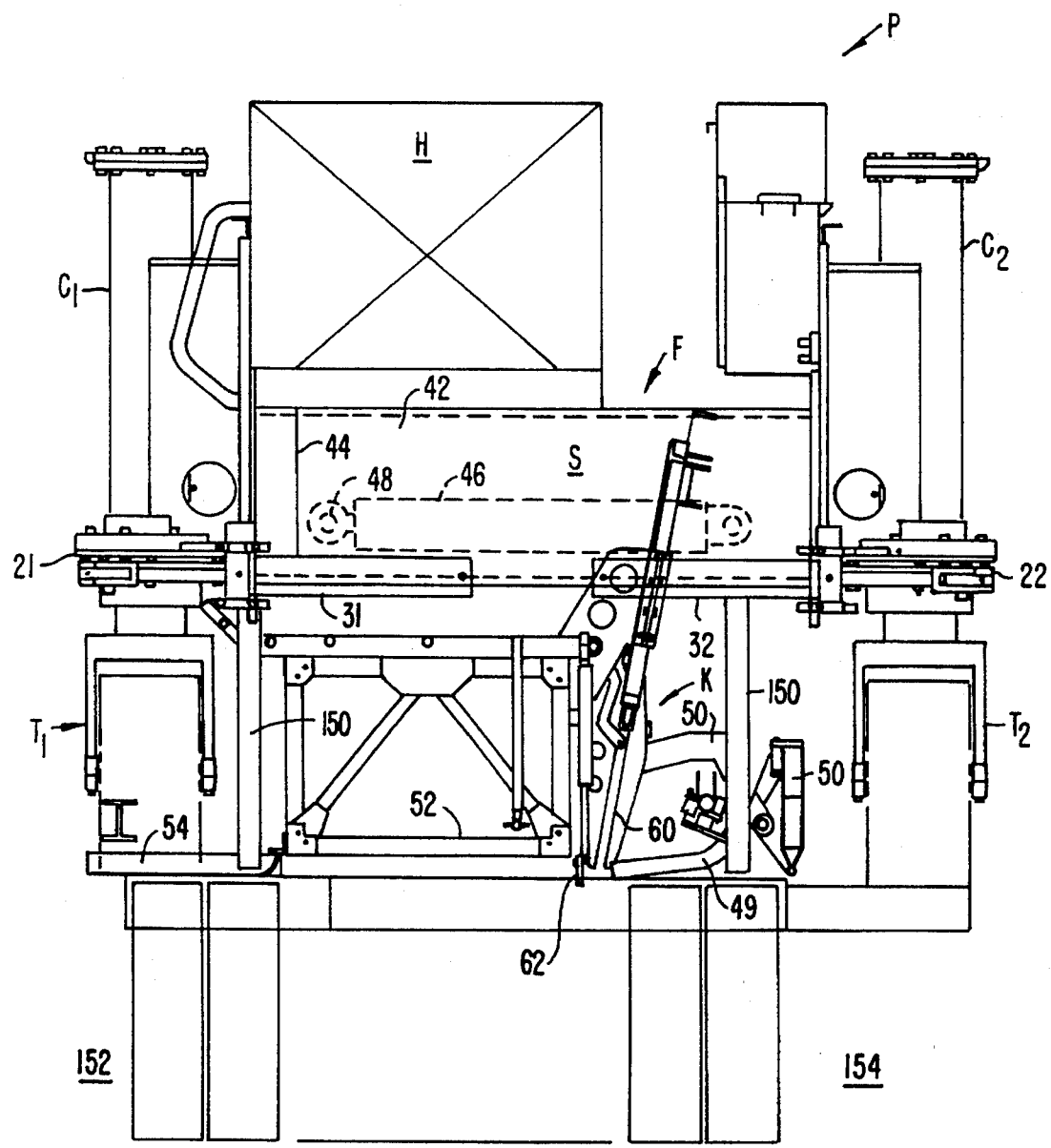
FIG. 6 is a side elevation of the paver taken with the aspect of FIG. 5 illustrating the tracks elevated to the level of the flat bed, the paver supported by supplemental supports to the flatbed, and the side bolsters contracted to bring the elevated tracks within the transportable envelope of the paver.

Referring to FIG. 6, the remainder of the disposition of the paver for transport can be readily understood. Tracks $T_1$–$T_4$ are first raised. Such raising occurs until the respective treads of tracks $T_1$–$T_4$ clear flatbed trailer B. Thereafter, side bolsters $S_1$–$S_2$ are contracted. This causes track $T_1$ and $T_2$ to overlie driver's side edge 152 of flatbed trailer B.

It will be observed that track $T_2$ extends outward of passenger side edge 154 of flatbed trailer B. This disposition is tolerable for in actual fact that the paver profile is transportable within a maximum width envelope which can be legally transported on the highway without a pilot car (in the U.S.A. 12' or 3.657 M) in the contracted disposition. Most importantly, and with the exception of a small hinged section of rear walkway and float pan 54, and a small hinged section the side form, substantially no machine disassembly is required. A specific time example can be helpful.

For the evolution from a paving disposition to a transport disposition, only about one hour is consumed. Assuming that job sites are adjacent, actual paving at one site can be discontinued, transport can occur, and paving resumed all in the same work shift. This is to be contrasted with pavers of the prior art—such as that illustrated in FIG. 1—where an entire shift can be consumed preparing a paver from paving for transport or preparing a paver from transport for paving. Substantial savings result.

As a variation to the loading method described above, the machine user could load the machine on a special trailer of a width that would allow the paver, if ramps were provided, to crawl up and onto the trailer from the end of the trailer.

Figure 7:
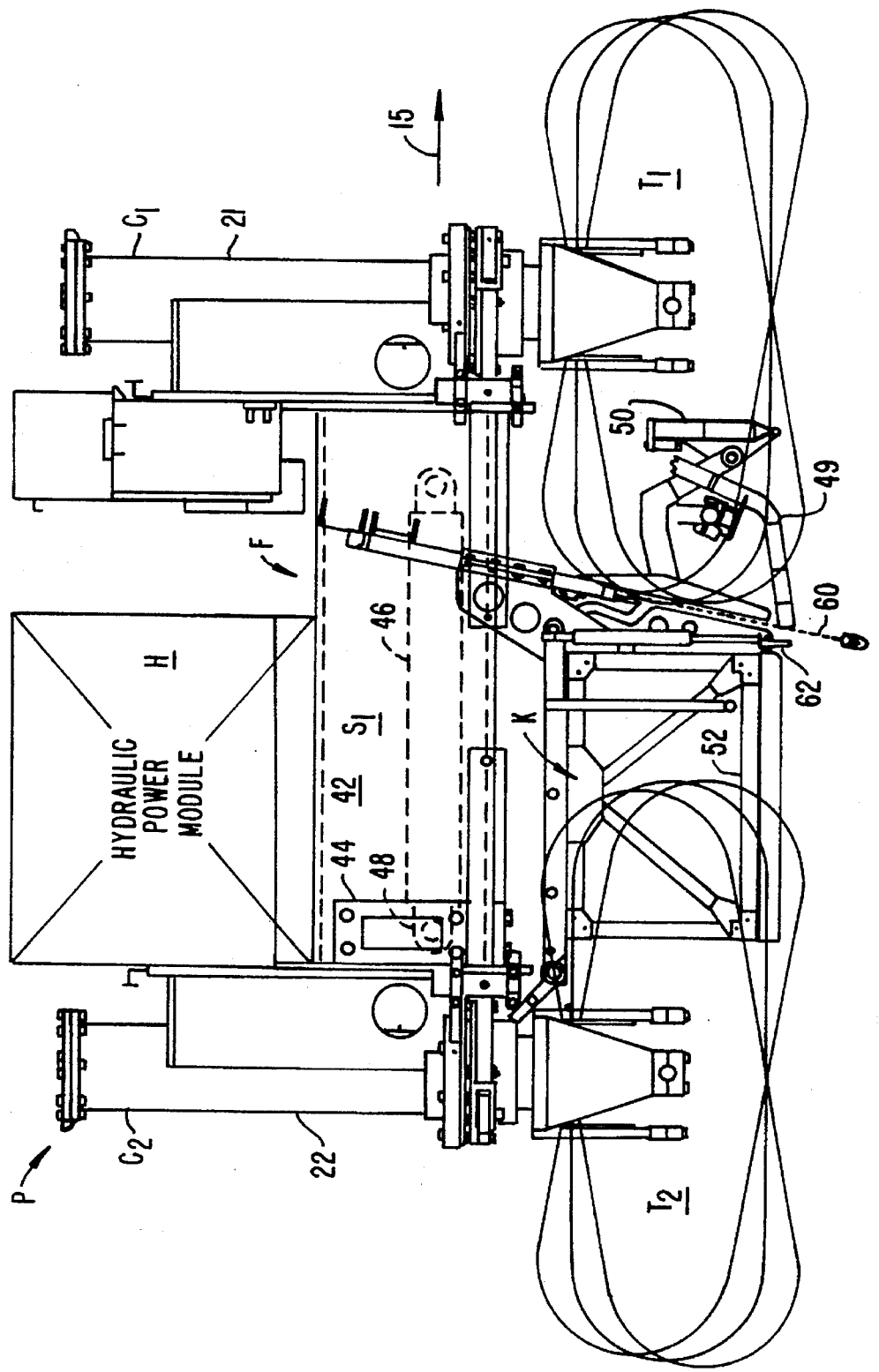
FIG. 7 illustrates a side elevation from the aspect of FIG. 5 illustrating the advantage of the paver in contracting its dimension in the direction of paving for close work to obstacles, such as buildings and the like; and, FIG. 8 is a plan view of a crawler according to this invention illustrating an arrangement of the crawler drive to maintain the crawler profile within a narrow envelopment.

It will be understood that the paver of this invention has an additional advantage. Specifically, it is sometimes required for pavers to work close to obstacles—such buildings and bridges. In this case, as illustrated in FIG. 7, side bolsters $S_1$–$S_2$ can be contracted to shorten the length of the paver in direction 15 of paving travel. Such shortening lessens that section of paving which must be hand paved to complete an airport apron or finished roadway R to a structure.

Figure 8:
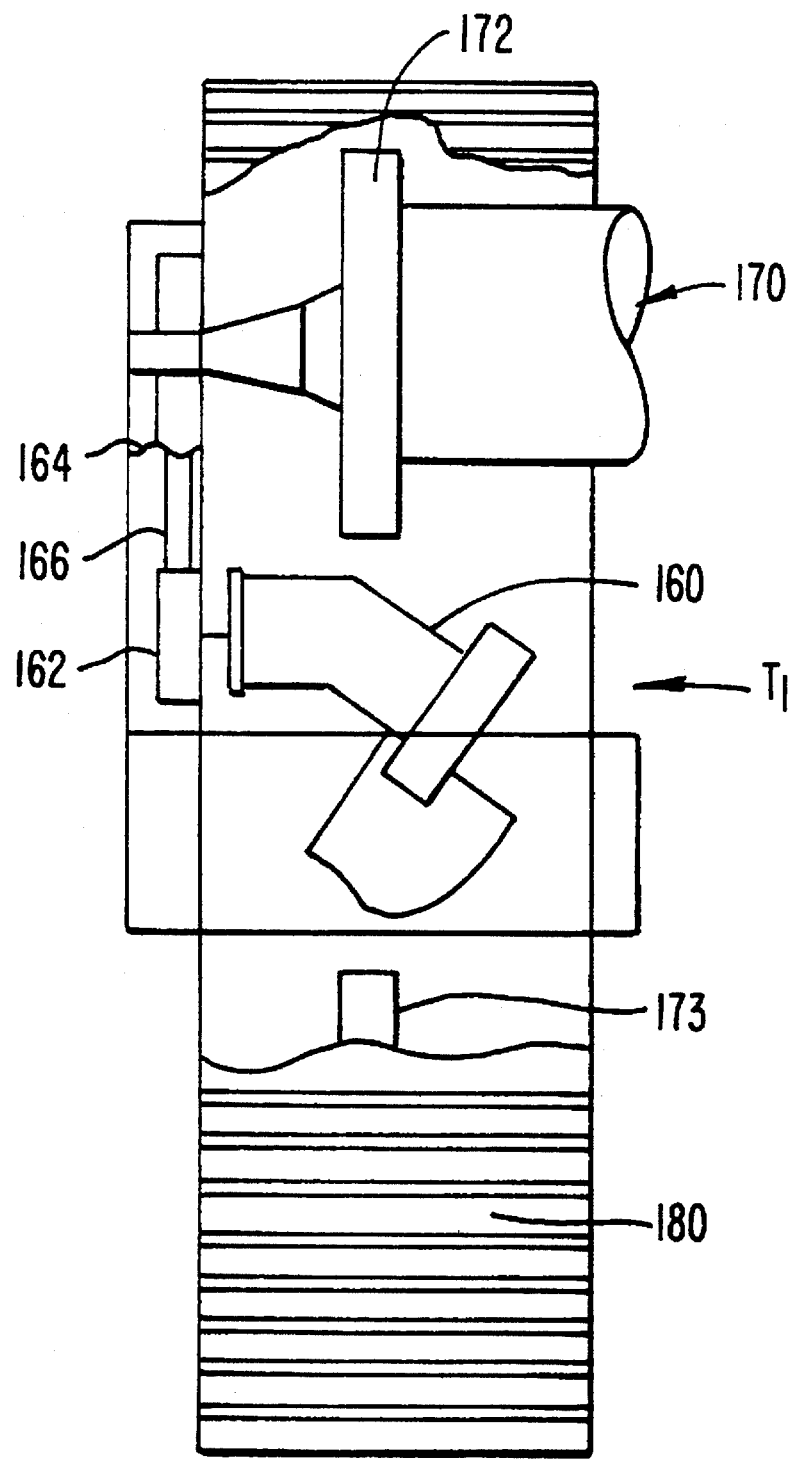

It is required that tracks $T_1$–$T_4$ have a narrow profile. FIG. 8 illustrates in plan view a narrowed track configuration which is compatible with this invention. Simply stated, endless tracks 180 are installed on track wheels 172–173. Hydraulic motor 160 drives motor sheave 162 which in turn rotates endless chain 166 powering planetary gear sheave 164. Planetary gear sheave 170 rotates track wheels 172 propelling track $T_1$. As is conventional, guard 182 covers the driving chain and sprockets.

In the above specification, we have illustrated the preferred embodiment to include male and female telescoping side bolsters or other members. The reader is to understand that these respective terms are used in the broadest possible sense. What is required is that the two members move relative to one another with cantilever support being taken by one member from an adjacent member. Thus, all types relatively sliding support and extension schemes are intended to be covered. These include conventional telescoping connection, and side-by-side members which slide relative to one another and provide in the extended position relative support to one another.

The disclosed configuration brings to this market for the first time a readily transportable paver which does not require concomitant substantial disassembly.

What is claimed is:

1. In a four track paver for paving along a paving path over ground, the four track paver comprising:

a rectilinear frame having two sides extending parallel to the paving path of the paver, two spanning members extending normal to the paving path of the paver with four corners joining the sides and spanning members;

four crawler tracks with one crawler track adjoining each of the four corners of the rectilinear frame, each crawler track being centrally pivotal to one of the four corners of the rectilinear frame to pivot at least 90° with respect to the frame corner from a position parallel to the paving path to a direction normal to the paving path;

hydraulic cylinders fastened between the crawler tracks and frame for raising and lowering the rectilinear frame relative to the crawler tracks;

a paving kit suspended from the rectilinear frame below the rectilinear frame and between the sides for finishing concrete on the ground in front of the paver;

each side of the rectilinear frame extending parallel to the paving path of the paver is a side bolster including first and second telescoping members to enable the rectilinear frame to expand and contract along the paving path.

2. In a four track paver for paving along a paving path over ground according to claim 1 and wherein:

said hydraulic cylinders are fastened between the crawler tracks and frame by a bolster.

3. In a four track paver for paving along a paving path over ground according to claim 1 and wherein:

each telescoping side bolster includes clamping means for maintaining the telescoping members in clamped relation one to another.

4. In a four track paver for paving along a paving path over ground according to claim 1 and wherein:

each telescoping side bolster includes means for powering telescoping movement.

5. In a four track paver for paving along a paving path over ground according to claim 3 and wherein:

the means for powering telescoping movement includes hydraulic cylinders.

6. In a four track paver for paving along a paving path over ground according to claim 1 and wherein:

the four crawler tracks with one crawler track adjoining each of the four corners of the rectilinear frame are pivotal from a first disposition relative to the frame for propelling of the frame during paving to a second disposition relative to the frame aligned parallel to the frame for transport of the frame.

7. In a four track paver for paving along a paving path over ground according to claim 3 and wherein:

each crawler track at each corner of the frame includes hydraulic cylinders for turning the crawler track relative to the frame between the first disposition and the second disposition relative to the frame.

8. A process for configuring a four track paver for transport from a configuration for paving along a paving path over ground, the four track paver having, a rectilinear frame having two sides extending parallel to the paving path of the paver, two spanning members extending normal to the paving path of the paver along a longitudinal axis with four corners joining the sides and spanning members;

four crawler tracks with one crawler track adjoining each of the four corners of the rectilinear frame;

hydraulic cylinders fastened between the crawler tracks and frame for raising and lowering the rectilinear frame relative to the crawler tracks;

a paving kit suspended from the rectilinear frame below the rectilinear frame and between the sides for finishing concrete on the ground in front of the paver; and, each side of the rectilinear frame including first and second telescoping members to enable the rectilinear frame to expand and contract along the paving path;

the process of preparing the paver for transport including the steps of:

elevating the frame relative to the crawler tracks to lift the paving kit free of the ground;

providing a flat bed transport having a transportable dimension slightly exceeding a width of the flat bed;

placing the flat bed transport between the paving kit and ground;

lowering the kit and frame for support from the flat bed transport;

raising the crawler tracks from the ground and above the flat bed transport; and, after the raising step reducing the lengths of the sides of the frame by contracting the first and second telescoping members to bring the crawler tracks within a transportable dimension of the flat bed transport.

9. A process for configurating a four track paver for transport according to claim 8 and further including the steps of:

providing stanchions between the flat bed and paver; and, lowering the paver for support from the flat bed through the stanchions.

10. A process for configuring a four track paver for transport according to claim 8 and further including the steps of:

before the elevating the frame step, turning the crawler tracks into alignment parallel to the longitudinal axis of the frame to produce a minimum transport width of the paver.

11. A process for configuring a four track paver for transport according to claim 8 and further including the steps of:

producing a transport width of 12 feet or less.

12. In a four track paver for paving along a paving path over ground, the four track paver for self loading to a bed of a transporting truck, the four track paver comprising in combination;

a rectilinear frame having two sides extending parallel to the paving path of the four track paver, two spanning members extending normal to the paving path of the four track paver with four corners joining the sides and spanning members;

each side of the rectilinear frame extending parallel to the paving path of the four track paver is a side bolster including first and second telescoping members to enable the rectilinear frame to expand and contract along the paving path to have a first larger dimension used for paving and a second small dimension used for transport;

four crawler tracks with one crawler track adjoining each of the four corners of the rectilinear frame, each crawler track being centrally pivotal of the crawler track to one of the four corners of the rectilinear frame to pivot at least 90° with respect to each frame corner from a position parallel to the paving path for paving to a direction normal to the paving path for transport;

means for rotating the crawler tracks from a position parallel to the direction of paving 90° to a direction normal to the direction of paving;

a paving kit suspended from the rectilinear frame below the rectilinear frame and between the sides for finishing concrete on the ground in front of the four track paver; and, hydraulic cylinders fastened between the crawler tracks and frame for raising and lowering the rectilinear frame relative to the crawler tracks to permit the paving kit to be lifted to a resting position on the bed of the transporting truck and thereafter to lift the crawler tracks off of the ground whereby the four track paver is configured for transport on the bed of the transporting truck.

13. In a four track paver for paving along a paving path over ground according to claim 12 and wherein:

said hydraulic cylinders are fastened between the crawler tracks and frame by a bolster.

14. In a four track paver for paving along a paving path over ground according to claim 12 and wherein:

each telescoping side bolster includes clamping means for maintaining the telescoping members in clamped relation one to another.

15. In a four track paver for paving along a paving path over ground according to claim 12 and wherein:

each telescoping side bolster includes means for powering telescoping movement.

16. In a four track paver for paving along a paving path over ground according to claim 15 and wherein:

the means for powering telescoping movement includes hydraulic cylinders.

* * * * *